(12) United States Patent
Gallagher

(10) Patent No.: US 8,922,700 B2
(45) Date of Patent: Dec. 30, 2014

(54) IMAGING SYSTEM INCLUDING DISTRIBUTED PHASE MODIFICATION AND ASSOCIATED METHODS

(75) Inventor: Dennis J. Gallagher, Boulder, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 896 days.

(21) Appl. No.: 12/936,344

(22) PCT Filed: Apr. 3, 2009

(86) PCT No.: PCT/US2009/039518
§ 371 (c)(1),
(2), (4) Date: Oct. 4, 2010

(87) PCT Pub. No.: WO2009/124276
PCT Pub. Date: Oct. 8, 2009

(65) Prior Publication Data
US 2011/0025877 A1    Feb. 3, 2011

Related U.S. Application Data

(60) Provisional application No. 61/042,161, filed on Apr. 3, 2008.

(51) Int. Cl.
*H04N 5/225* (2006.01)
*G02B 27/00* (2006.01)
*G02B 26/00* (2006.01)

(52) U.S. Cl.
CPC .......... *G02B 27/0025* (2013.01); *G02B 26/005* (2013.01)
USPC .......................................... 348/340; 382/263

(58) Field of Classification Search
USPC ............... 348/222.1, 335, 340; 382/263, 266; 359/796, 279, 11, 96
See application file for complete search history.

(56) References Cited

U.S. PATENT DOCUMENTS

| | | | |
|---|---|---|---|
| 5,499,111 A * | 3/1996 | Sato et al. | 382/252 |
| 5,748,371 A | 5/1998 | Cathey | |
| 6,341,136 B1 | 1/2002 | Hiiro | |
| 2006/0050409 A1 | 3/2006 | George | |
| 2008/0007797 A1* | 1/2008 | Hayashi et al. | 358/474 |
| 2008/0136956 A1* | 6/2008 | Morris et al. | 348/340 |
| 2010/0295973 A1* | 11/2010 | Aubuchon et al. | 348/241 |

FOREIGN PATENT DOCUMENTS

WO    WO 2007054938 A2 *    5/2007

OTHER PUBLICATIONS

U.S. Appl. No. 61/001,988, filed Nov. 6, 2007.*
International Search Report and Written Opinion issued in related PCT Patent Application Serial No. PCT/US2009/039518, Jun. 16, 2009, 12 pages.
International Preliminary Report of Patentability issued in related PCT Patent Application Serial No. PCT/US2009/039518, May 11, 2010, 6 pages.
Response to Written Opinion filed in related PCT Patent Application Serial No. PCT/US2009/039518, Feb. 3, 2010, 6 pages.

* cited by examiner

*Primary Examiner* — Nelson D. Hernández Hernández
(74) *Attorney, Agent, or Firm* — Lathrop & Gage LLP

(57) ABSTRACT

An imaging system for imaging a range of field points over on- and off-axis fields includes an image sensor for capturing image data, and first and second optical elements that are spaced apart and cooperate to image light at the image sensor. The first and second optical elements are configured to jointly modify phase of the light transmitted therethrough such that point-spread functions ("PSFs") corresponding to the range field points are substantially uniform over on- and off-axis fields.

8 Claims, 13 Drawing Sheets

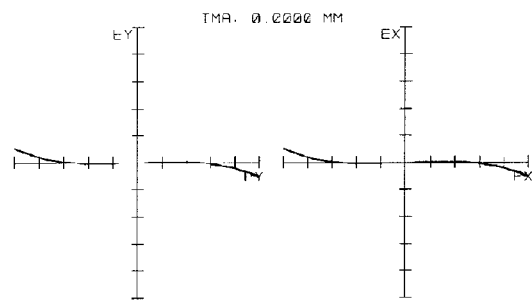
FIG. 9  FIG. 10  FIG. 11  FIG. 12
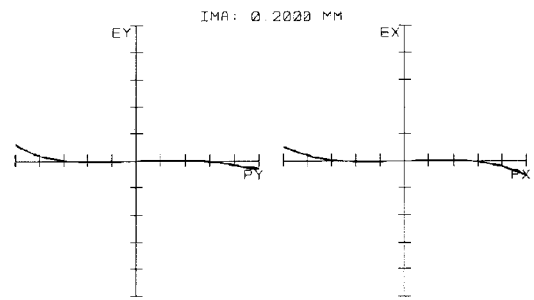
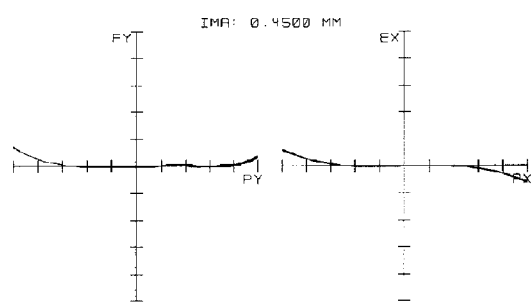
FIG. 13  FIG. 14  FIG. 15  FIG. 16
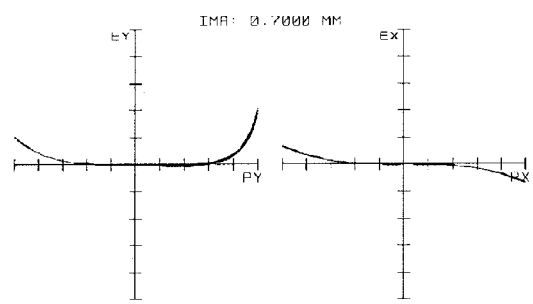

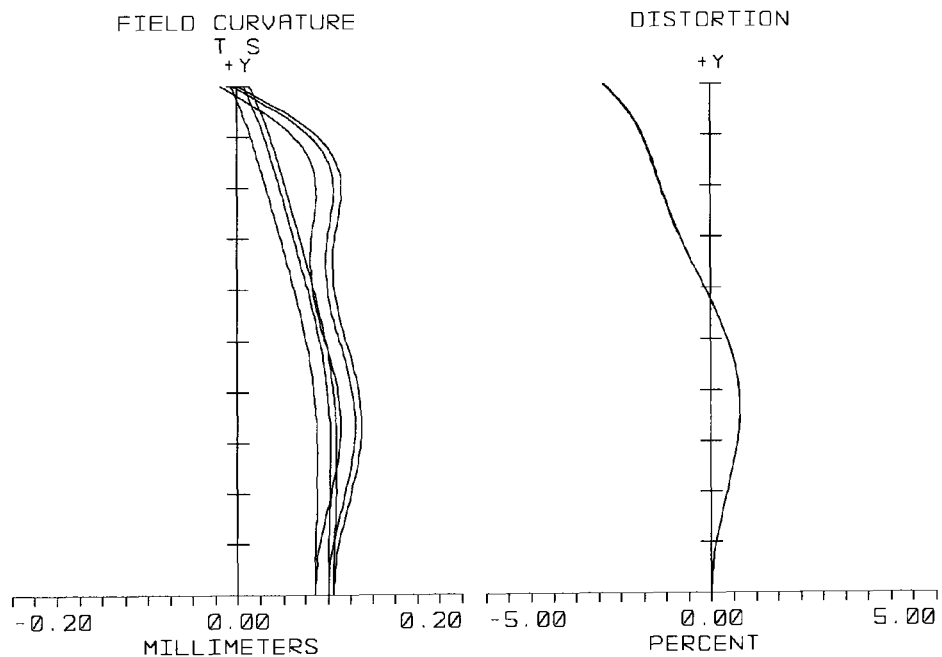
FIG. 17      FIG. 18
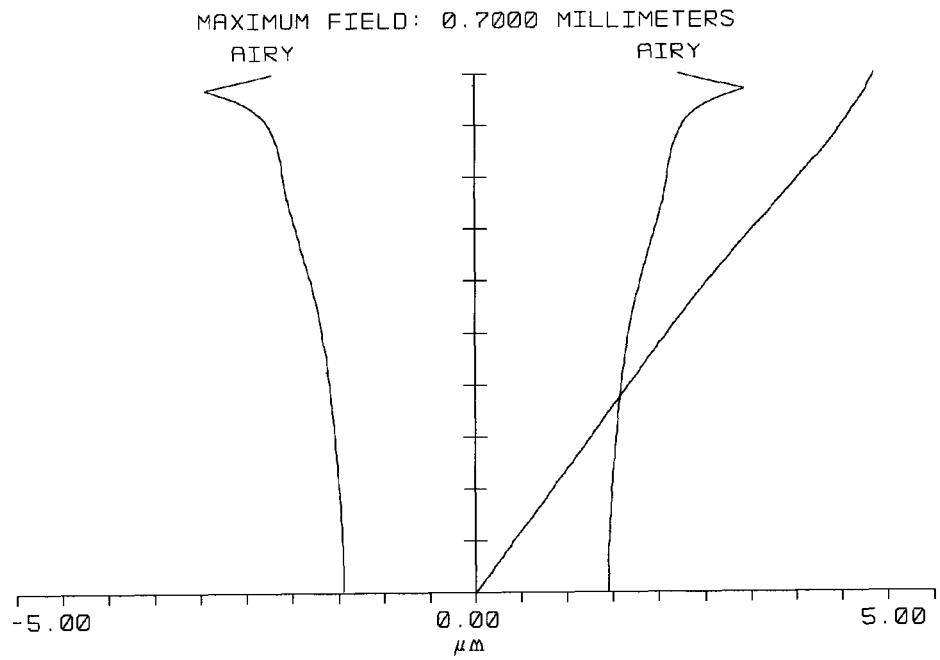
FIG. 19

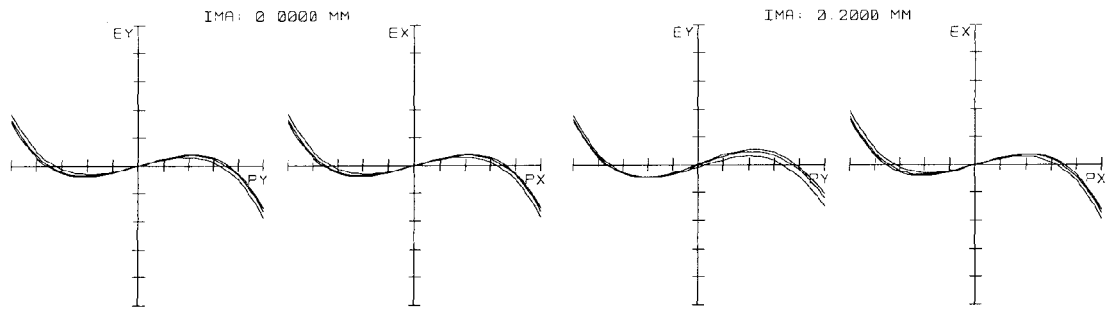
FIG. 20  FIG. 21  FIG. 22  FIG. 23
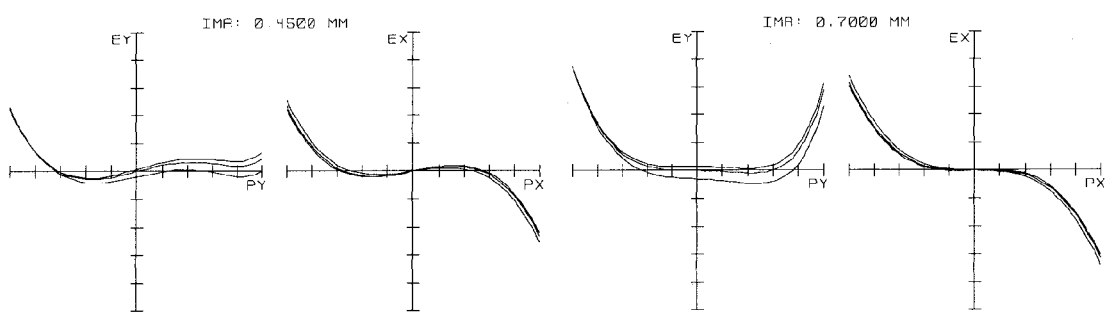
FIG. 24  FIG. 25  FIG. 26  FIG. 27

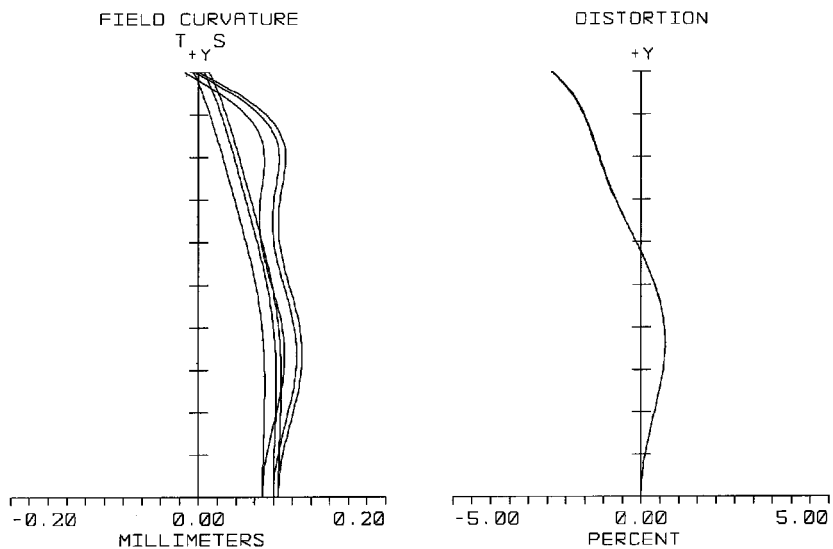
FIG. 28          FIG. 29
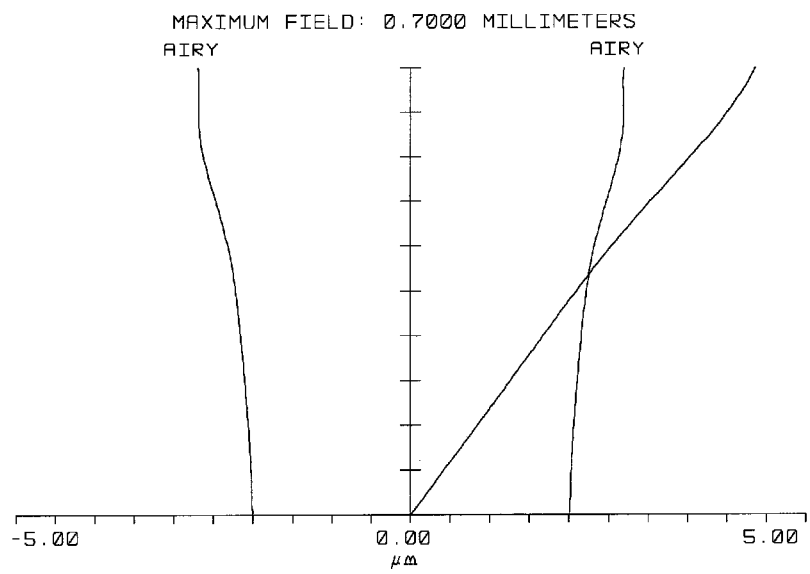
FIG. 30

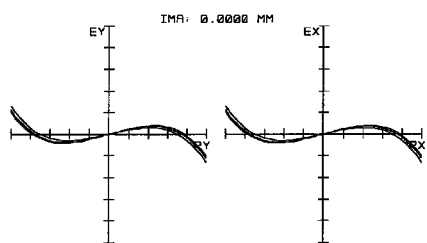
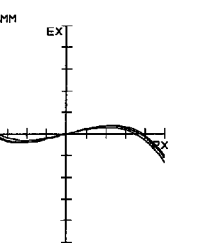
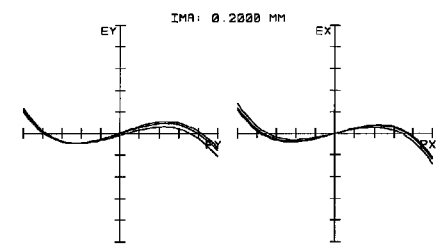
FIG. 31   FIG. 32   FIG. 33   FIG. 34
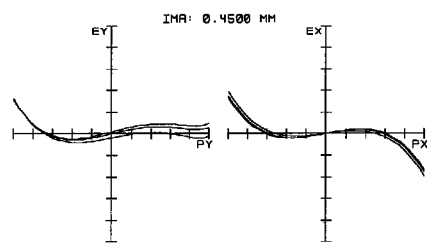
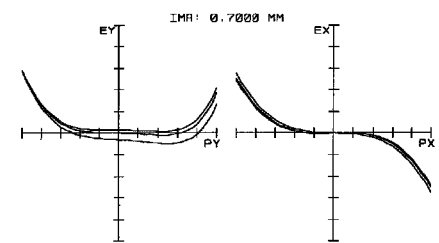
FIG. 35   FIG. 36   FIG. 37   FIG. 38

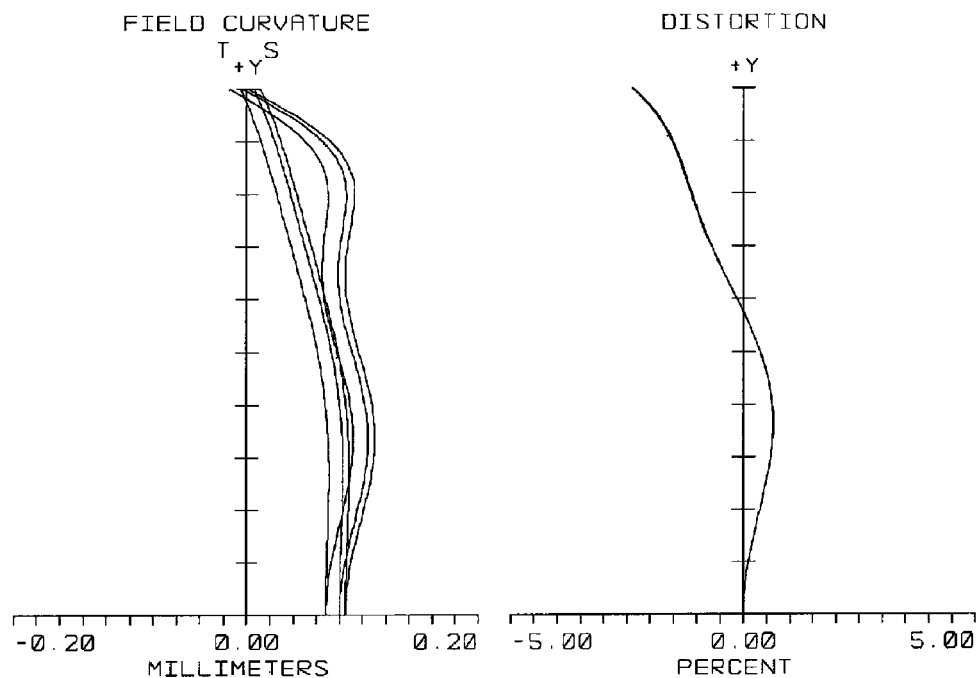
FIG. 39  FIG. 40
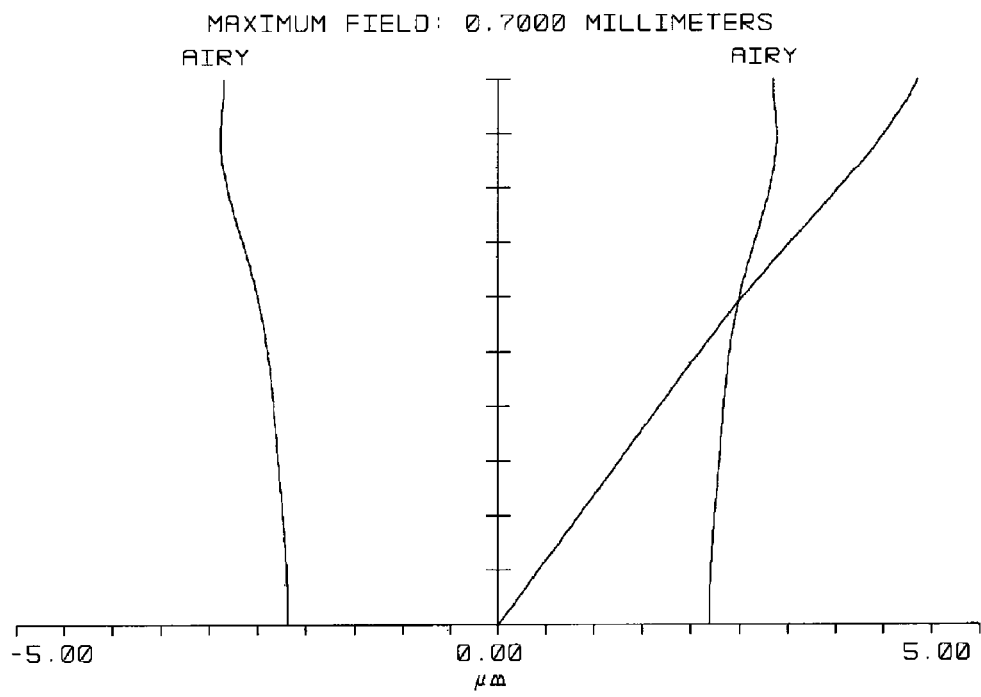
FIG. 41

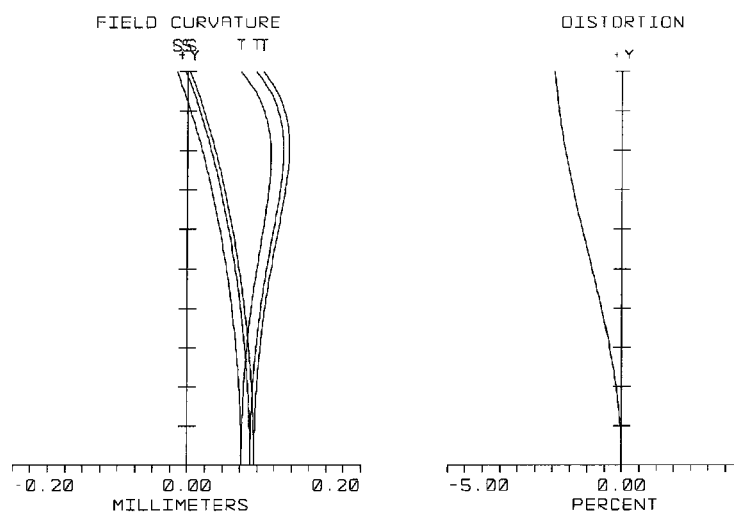
FIG. 54  FIG. 55
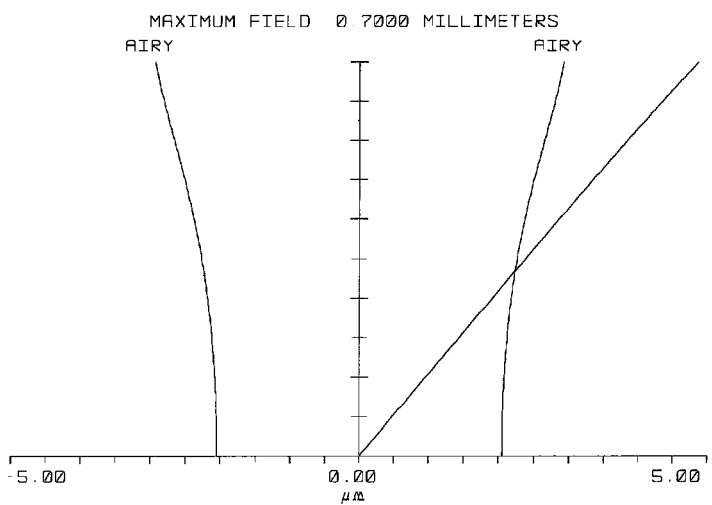
FIG. 56

US 8,922,700 B2

IMAGING SYSTEM INCLUDING DISTRIBUTED PHASE MODIFICATION AND ASSOCIATED METHODS

CROSS-REFERENCE TO RELATED APPLICATIONS

This application claims priority to U.S. Provisional Patent application No. 61/042,161, filed on 3 Apr. 2008 and entitled IMAGING SYSTEMS INCLUDING DISTRIBUTED PHASE MODIFICATION AND ASSOCIATED METHODS, which application is incorporated herein by reference in its entirety.

BACKGROUND

Traditionally, in designing an imaging system, an optical designer manipulates several parameters, such as lens material, surface curvature and aperture size, and optimizes the parameters to arrive at an imaging system that performs as closely to the desired system as possible within the given constraints.

Wavefront Coded® ("WFC") imaging systems, such as described in U.S. Pat. No. 5,748,371 to Cathey et al., which is incorporated herein by reference in its entirety, utilize aspheric, phase-modifying optics for modifying the phase of electromagnetic energy transmitted therethrough. The phase-modifying optics may be rotationally symmetric or non-rotationally symmetric and, in combination with digital signal processing, function to minimize misfocus-related aberrations that may be present in standard imaging systems (e.g., without aspheric, phase-modifying optics). Some examples of misfocus-related aberrations include chromatic aberration, Petzval curvature, astigmatism, coma, spherical aberration, and temperature-related misfocus among others.

SUMMARY

The following embodiments and aspects thereof are described and illustrated in conjunction with systems, tools and methods, which are meant to be exemplary and illustrative, not limiting in scope. In various embodiments, one or more limitations associated with the above-described systems and methods have been addressed, while other embodiments are directed to other improvements.

In an embodiment, an imaging system for imaging a range of field points over on- and off-axis fields includes an image sensor for capturing image data, and first and second optical elements that are spaced apart and cooperate to image light at the image sensor. The first and second optical elements are configured to jointly modify phase of the light transmitted therethrough such that point-spread functions ("PSFs") corresponding to the range field points are substantially uniform over on- and off-axis fields.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIGS. 9-16 are a series of ray fan plots for the two-element F/2.0 distributed phase modification imaging system of FIG. 1.

FIG. 17 is a field curvature plot for the two-element F/2.0 distributed phase modification imaging system of FIG. 1.

FIG. 18 is a distortion plot for the two-element F/2.0 distributed phase modification imaging system of FIG. 1.

FIG. 19 is a plot of lateral color for the two-element F/2.0 distributed phase modification imaging system of FIG. 1.

FIGS. 20-27 show a series of ray fan plots for the two-element F/2.8 distributed phase modification imaging system of FIG. 2.

FIG. 28 is a field curvature plot for the two-element F/2.8 distributed phase modification imaging system of FIG. 2.

FIG. 29 is a distortion plot for the two-element F/2.8 distributed phase modification imaging system of FIG. 2.

FIG. 30 is a plot of lateral color for the two-element F/2.8 distributed phase modification imaging system of FIG. 2.

FIGS. 31-38 show a series of ray fan plots for the two-element F/3.1 distributed phase modification imaging system of FIG. 3.

FIG. 39 is a field curvature plot for the two-element F/3.1 distributed phase modification imaging system of FIG. 3.

FIG. 40 is a distortion plot for the two-element F/3.1 distributed phase modification imaging system of FIG. 3.

FIG. 41 is a plot of lateral color for the two-element F/3.1 distributed phase modification imaging system of FIG. 3.

FIG. 54 is a field curvature plot for the two-element distributed phase modification imaging system of FIG. 44.

FIG. 55 is a distortion plot for the two-element distributed phase modification imaging system of FIG. 44.

FIG. 56 is a plot of lateral color for the two-element distributed phase modification imaging system of FIG. 44.

DETAILED DESCRIPTION OF ILLUSTRATED EMBODIMENTS

Figure 1:
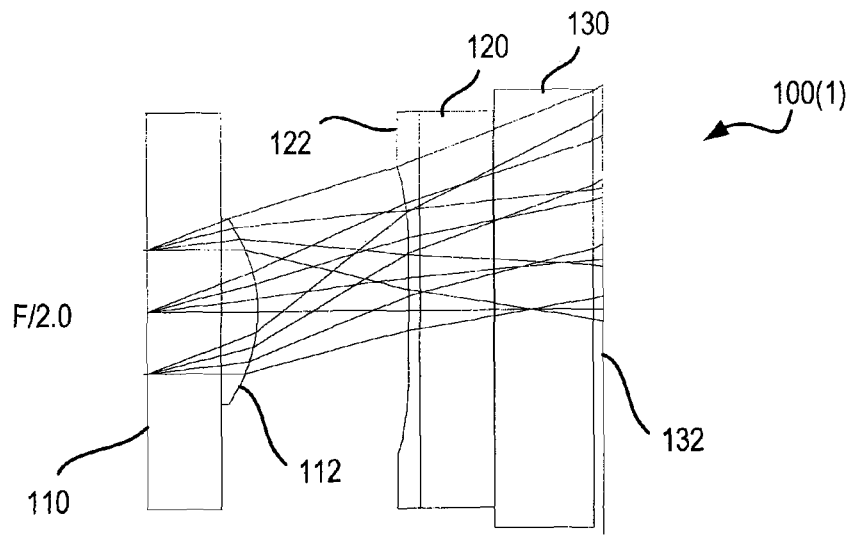
FIGS. 1-3 illustrate exemplary designs for two-element distributed phase modification imaging systems with three different F-numbers ("F/#s"), in accordance with an embodiment.

The phase-modified imaging systems described herein are configured to distribute the phase modification effect of a WFC imaging system over more than one optical element in the imaging system; this concept is referred to herein as "distributed phase modification". In one embodiment, a first optical element in the imaging system is configured as a phase modifying element. By implementing higher order aspheric terms in the design of a second optical element in the imaging system, the phase modification effected by the second element may be used to further control aberrations through field. In other words, phase modification effected by the second optical element may be utilized to balance or supplement the phase modification effected by the first element. This distributed phase modification approach is advantageous, for example, for use in imaging systems in which instantaneous fields of view for on-axis and off-axis fields of an optical element nearest the focal plane are on different areas of that optical element. Such separation of instantaneous fields of view is not necessary, however, for the implementation of distributed phase modification. For example, phase modification effected by a near-focal-plane element may be used to balance or supplement phase modification imparted by other optical elements located further from the focal plane. An image captured following the distributed phase modification imaging system may be processed using, for example, image sharpening techniques in order to generate a viewable image or an image for use in a task-based imaging system.

In one embodiment of a distributed phase modification imaging system, an imaging system may be designed to produce point-spread functions ("PSFs") that are substantially uniform for field points across the entire field of the imaging system. That is, this approach considers the phase modification effected by the entire imaging system at once. In this manner, the imaging system may be configured to provide appropriate phase modification to result in PSFs that are substantially similar throughout the on- and off-axis fields of an imaging system.

One method used to design such a distributed phase modification imaging system includes minimizing astigmatism such that a resulting imaging system produces substantially radially symmetric PSFs across the entire field of view. In such a system, a design merit function for optimization may be set to produce an imaging system in which the overall MTF is as high as possible. Simultaneously, tangential and sagittal MTF curves across the field of view of the imaging system should be similar in magnitude and shape. Such optimization parameters may sacrifice the overall on-axis MTF magnitude in order to maintain similarity of MTF curves across the field. However, the resulting radially symmetric PSFs (with little astigmatism) allow 'decoding' of the phase-encoded image by a single, simple but aggressive filter kernel, resulting in a clean, pleasing image across the entire field of view. Additionally, weighting functions may be applied to various parameters of the optical system design during optimization, for example, to minimize astigmatism and/or coma. In this way, a simple imaging system with as few as two powered optical surfaces may be configured to produce a high quality image.

Figure 2:
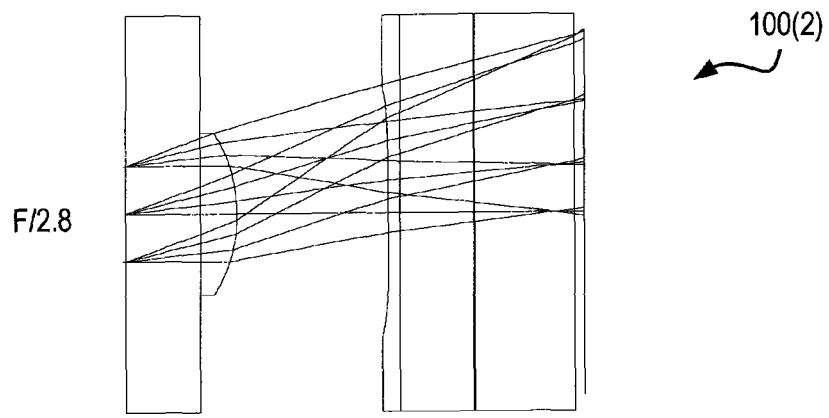
Figure 3:
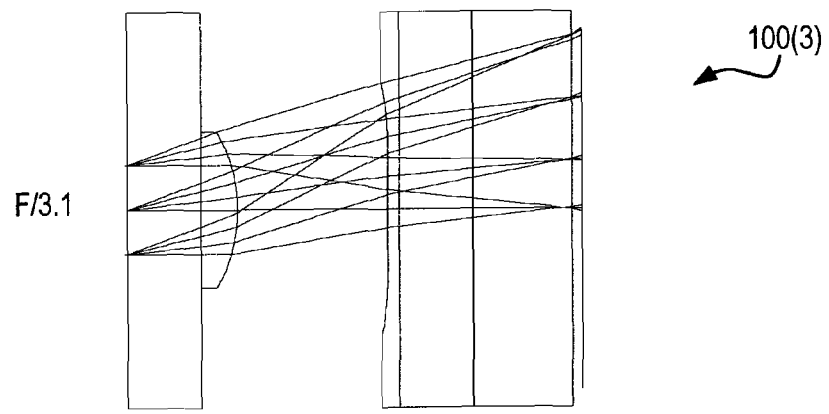

Examples of such a system is illustrated in FIGS. 1-3, which show two-element distributed phase modification imaging system designs for F/2.0, F/2.8 and F/3.1, respectively. The exemplary imaging systems of FIGS. 1-3 may be incorporated with, for example, a VGA format sensor with 1.75 μm pixel pitch within a miniature camera configuration. For instance, in FIG. 1, an imaging system 100(1) includes a first substrate 110 supporting a first optical element 112, which is separated by, for instance, a spacer (not shown, for clarity of illustration) from a second substrate 120 supporting a second optical element 122. Second substrate 120 is disposed adjacent to a cover glass 130 placed so as to protect a sensor 132. First and second substrates 110 and 120, for instance, may be 300 μm thick substrates, separated by a stack of two spacer wafers (not shown) that are 400 μm thick, and sensor cover glass 130 may be a standard 400 μm cover glass.

Figure 4:
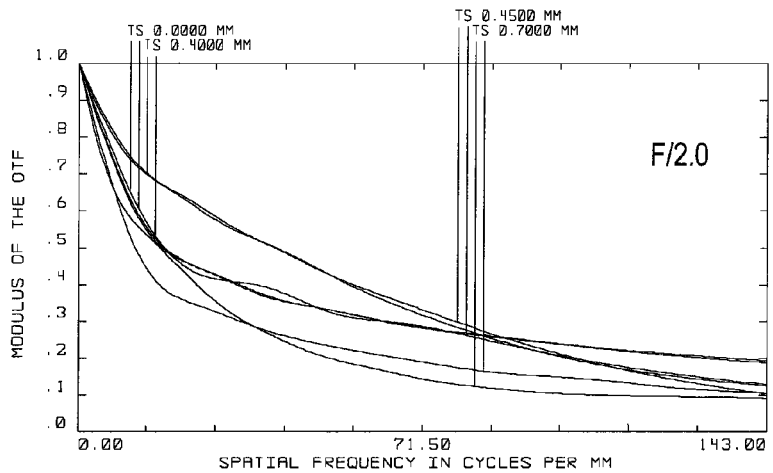
FIGS. 4-6 are plots of modulation transfer function (i.e., "MTF," or modulus of the optical transfer function, "OTF") curves for the two-element distributed phase modification imaging system designs of FIGS. 1-3, respectively.
Figure 5:
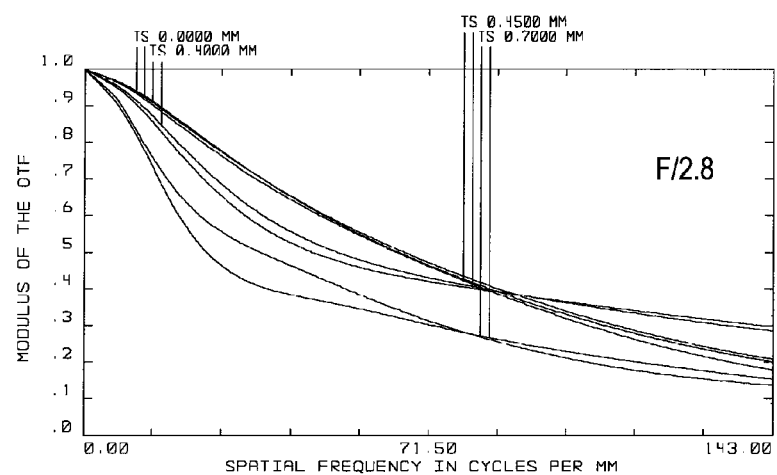
Figure 6:
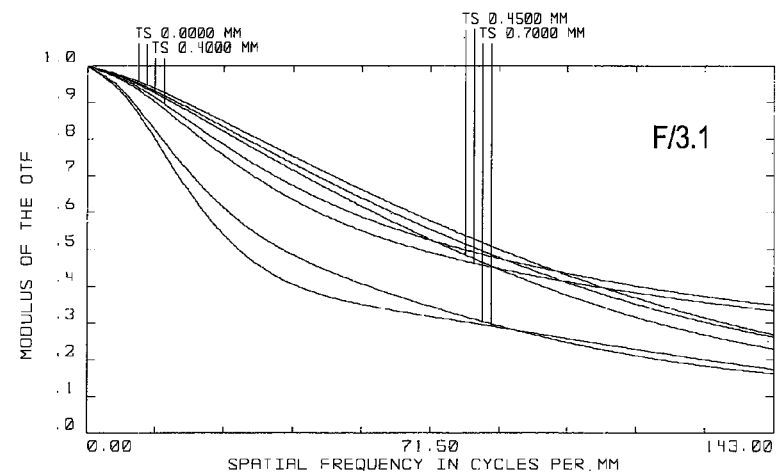

Imaging systems 100(1), 100(2) and 100(3) in FIGS. 1-3 respectively are substantially identical other than having apertures of different sizes. MTF curves for imaging systems 100(1), 100(2) and 100(3) of FIGS. 1-3 are shown in FIGS. 4-6, respectively; therefore, FIGS. 4-6 show that distributed phase modification may be incorporated into imaging systems with variable apertures. Such variable-aperture systems may be produced, for example, using physical apertures, electro-chromic, or photo-chromic materials, among others, to change stop sizes within the imaging system. In this way, a single imaging system may be designed to exhibit different F-numbers with different aperture sizes while still exhibiting good imaging performance.

Figure 7:
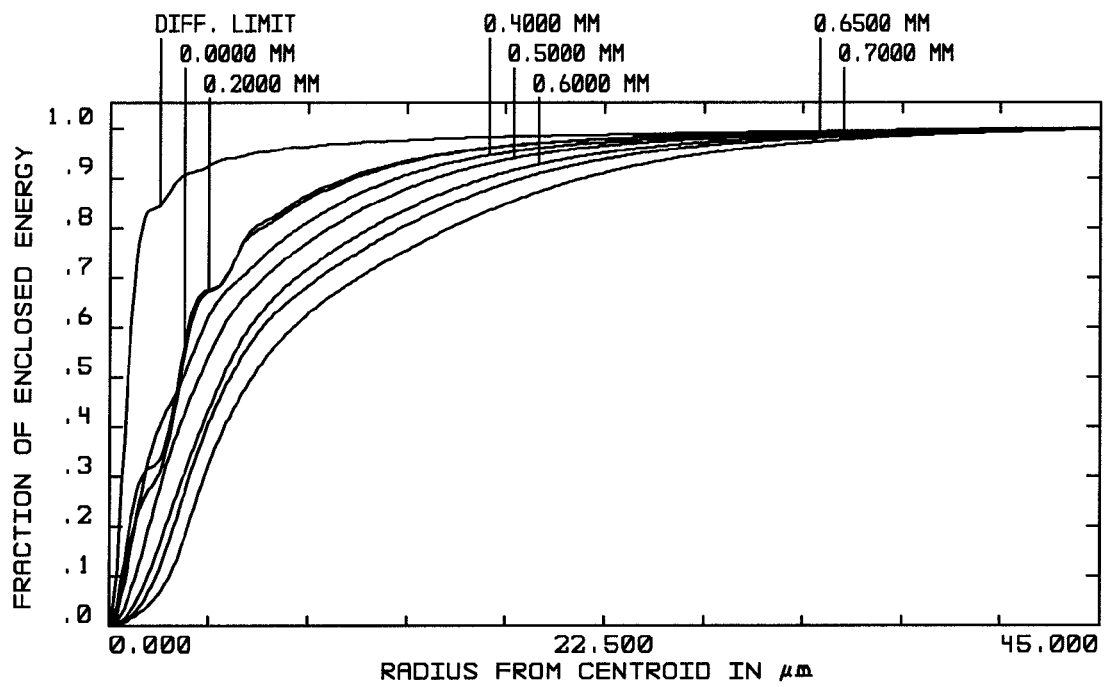
FIG. 7 is a plot of fraction of encircled energy as a function of radius and for different field values for the two-element distributed phase modification imaging system of FIG. 2 for F/2.8.

FIG. 7 is a plot illustrating fraction of encircled energy through field, for F/2.8 imaging system 100(2) of FIG. 2. This plot shows that the encircled energy is relatively constant across the field, thereby indicating that a single filter through field readily yield a good image. A suitable filter may be, for example, a simple 3 by 3 filter kernel with values:

$$\begin{bmatrix} -1 & 0 & -1 \\ 0 & 5 & 0 \\ -1 & 0 & -1 \end{bmatrix} \text{ or } \begin{bmatrix} -1.5 & 0 & -1.5 \\ 0 & 7 & 0 \\ -1.5 & 0 & -1.5 \end{bmatrix}.$$

Figure 8:
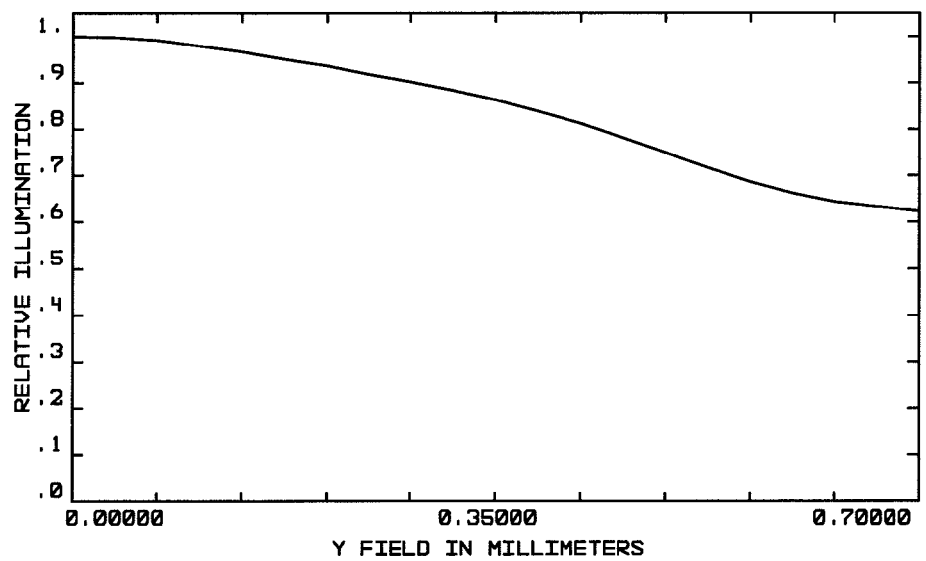
FIG. 8 is a plot of relative illumination along the y-field for the two-element distributed phase modification imaging system at F/2.8 as shown in FIG. 2.

FIG. 8 illustrates relative illumination in the Y-field for F/2.8 imaging system 100(2) shown in FIG. 2. In this case, distribution of phase modification between both optical elements results in more even illumination at the corners and edges of the VGA sensor in comparison to an imaging system without the distributed phase modification.

Other performance metrics for the two element distributed phase modification imaging system designs of FIGS. 1-3 are shown in FIGS. 9-19, FIGS. 20-30, and FIGS. 31-41, respectively. FIGS. 9-16 are a series of ray fan plots for F/2.0 imaging system 100(1) of FIG. 1. FIG. 17 is a field curvature plot for F/2.0 imaging system 100(1) of FIG. 1. FIG. 18 is a distortion plot for F/2.0 imaging system 100(1) of FIG. 1. FIG. 19 is a plot of lateral color for F/2.0 imaging system 100(1) of FIG. 1.

FIGS. 20-27 show a series of ray fan plots for F/2.8 imaging system 100(2) of FIG. 2. FIG. 28 is a field curvature plot for F/2.8 imaging system 100(2) of FIG. 2. FIG. 29 is a distortion plot for F/2.8 imaging system 100(2) of FIG. 2. FIG. 30 is a plot of lateral color for F/2.8 imaging system 100(2) of FIG. 2.

FIGS. 31-38 show a series of ray fan plots for F/3.1 imaging system 100(3) of FIG. 3. FIG. 39 is a field curvature plot for F/3.1 imaging system 100(3) of FIG. 3. FIG. 40 is a distortion plot for F/3.1 imaging system 100(3) of FIG. 3. FIG. 41 is a plot of lateral color for F/3.1 imaging system 100(3) of FIG. 3.

Figure 42:
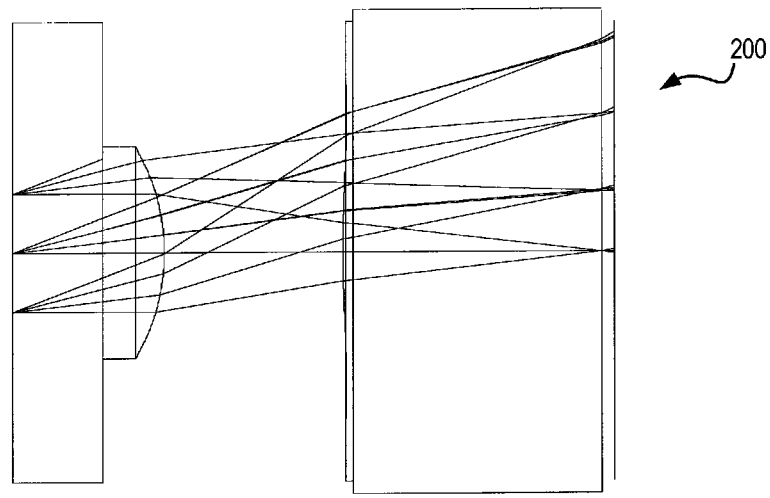
FIG. 42 illustrates one possible design for a two-element traditional imaging system with F/2.94 and without distributed phase modification.
Figure 43:
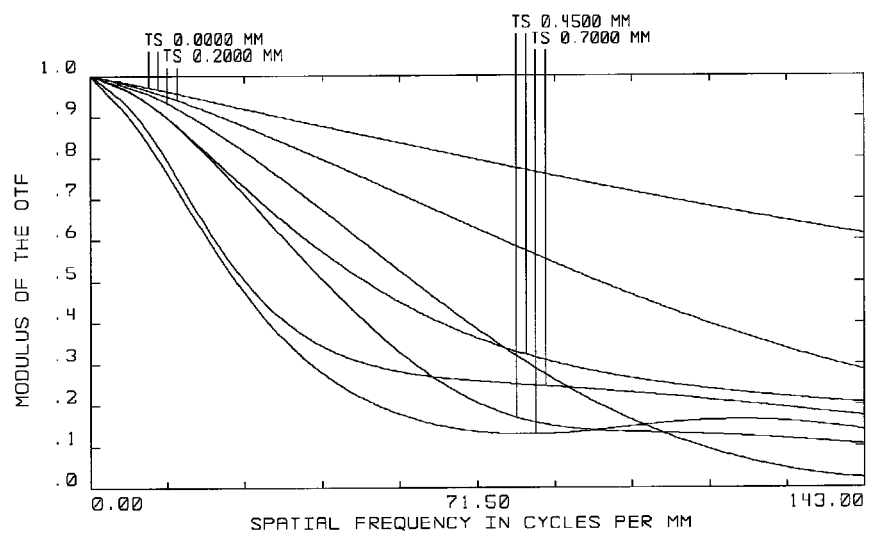
FIG. 43 is a plot of MTF curves for the traditional imaging system of FIG. 42.

For comparison, a 2-element standard (e.g., without distributed phase modification) imaging system 200 and its corresponding characteristics are shown in FIGS. 42-43 respectively. FIG. 42 shows one possible design for imaging system 200 with F/2.94 and without distributed phase modification. FIG. 43 is a plot of MTF curves for imaging system 200 of FIG. 42.

Figure 44:
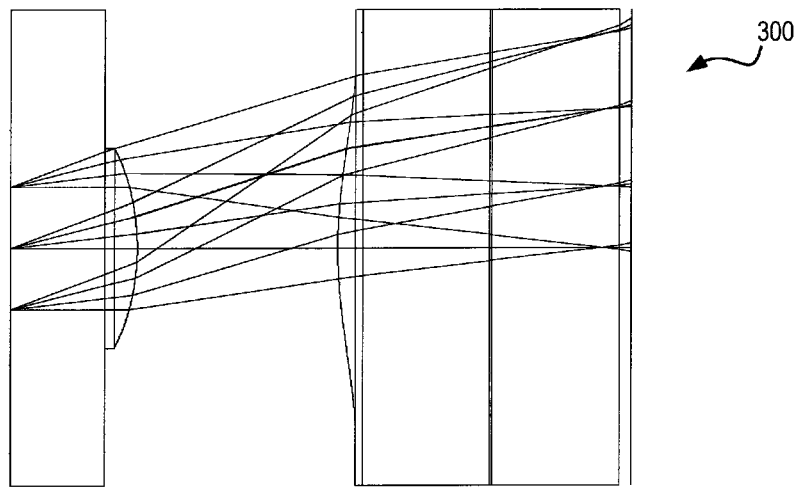
FIG. 44 illustrates one possible design for a two-element F/2.86 distributed phase modification imaging system, using two convex lenses.

An alternative design for a two-element distributed phase modification imaging system 300 using two convex lenses is shown in FIG. 44. Characteristics of imaging system 300 are detailed in FIGS. 45-56. FIG. 44 illustrates one possible design for two-element F/2.86 distributed phase modification imaging system 300 using two convex lenses.

Figure 45:
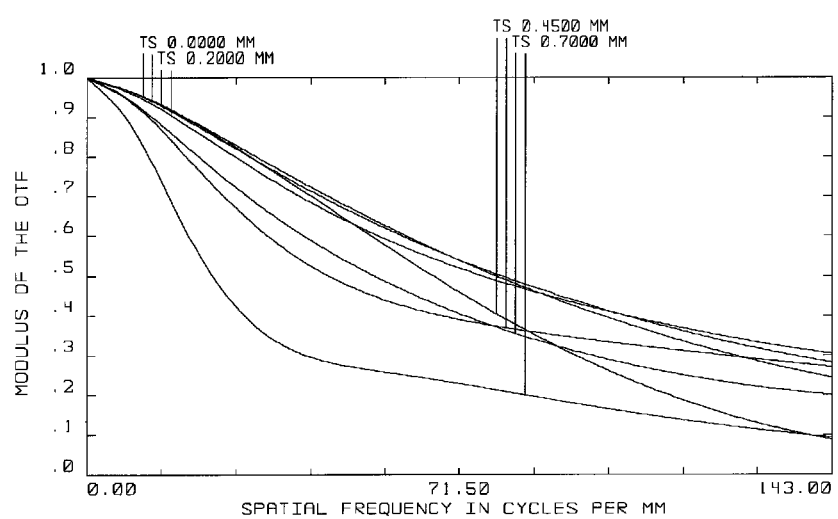
FIG. 45 is a plot of MTF curves for the two-element distributed phase modification imaging system of FIG. 44.
Figures 46, 47:
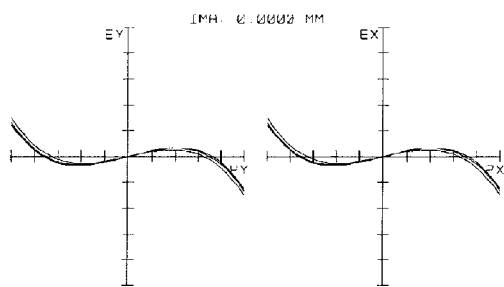
FIGS. 46-53 show a series of ray fan plots for the two-element distributed phase modification imaging system of FIG. 44.
Figures 48, 49:
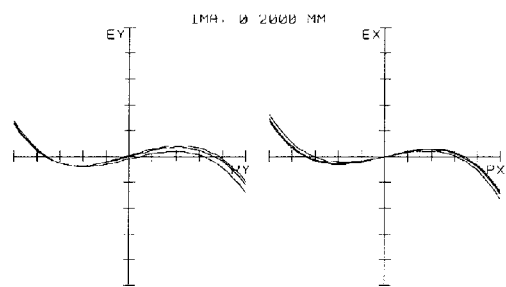
Figures 50, 51:
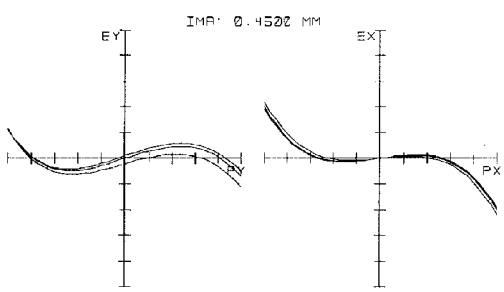
Figures 52, 53:
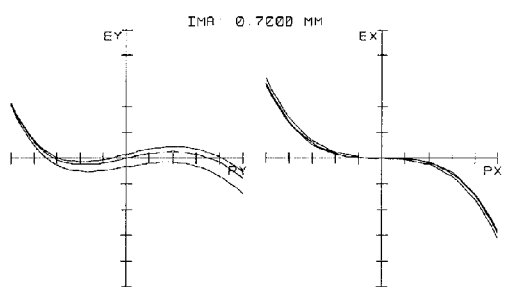

FIG. 45 is a plot of MTF curves for imaging system 300 of FIG. 44. FIGS. 46-53 show a series of ray fan plots for imaging system 300 of FIG. 44. FIG. 54 is a field curvature plot for imaging system 300 of FIG. 44. FIG. 55 is a distortion plot for imaging system 300 of FIG. 44. FIG. 56 is a plot of lateral color for imaging system 300 of FIG. 44.

Imaging systems designed using distributed phase modification may be configured to exhibit several advantageous features, depending on the design goals. One such feature is a decrease in astigmatism, so that sharpening across the entire image results in images that are pleasing to the viewer. Distributed phase modification imaging systems may also be designed to produce a substantially constant PSF for multiple F/#s through-field with little astigmatism, resulting in variable-aperture systems (see FIGS. 1-3, describing systems 100(1), 100(2) and 100(3), and their corresponding descriptions). Such multiple-F/# systems may be produced, for example, using electro-chromic materials to change stop sizes.

While the examples described in this disclosure describe a two-element distributed phase modification imaging system, it will be appreciated by those skilled in the art that distributed phase modification can be applied to any combination of two or more optical elements in imaging systems having more than two elements. It should thus be noted that the matter contained in the above description or shown in the accompanying drawings should be interpreted as illustrative and not in a limiting sense.

What is claimed is:

1. An imaging system for imaging a range of field points over on- and off-axis fields, the imaging system comprising:
    an image sensor for capturing image data, the image sensor including a cover glass;
    a first substrate supporting a first optical element; and
    a second substrate supporting a second optical element, the second substrate being separated from the first substrate by a spacer;
    wherein the first and second optical elements are capable of forming an image at the image sensor utilizing only the first and second optical elements, and
    wherein the first and second optical elements are configured for jointly modifying a phase of the light transmitted therethrough such that point-spread functions ("PSFs") corresponding to the range field points are substantially uniform over on- and off-axis fields, and
    wherein the substantially uniform PSFs from the transmitted light are achieved through interaction of only the configured first and second optical elements.

2. The imaging system of claim 1, further comprising a post-processor for processing the image data captured at the image sensor to produce a final image.

3. The imaging system of claim 2, wherein the post-processor comprises a filter kernel for processing the image data.

4. The imaging system of claim 3, wherein the filter kernel comprises a 3 by 3 filter kernel.

5. The imaging system of claim 4, wherein the 3 by 3 filter kernel is selected from a group of filter kernels consisting of:

$$\begin{bmatrix} -1 & 0 & -1 \\ 0 & 5 & 0 \\ -1 & 0 & -1 \end{bmatrix} \text{ and } \begin{bmatrix} -1.5 & 0 & -1.5 \\ 0 & 7 & 0 \\ -1.5 & 0 & -1.5 \end{bmatrix}.$$

6. The imaging system of claim 1, wherein the first optical element is configured for providing a first phase modification, and wherein the second optical element is configured for providing a different, second phase modification.

7. The imaging system of claim 1, further comprising an aperture defining an aperture size.

8. The imaging system of claim 7, wherein the aperture is configured to be variable so as to be switchable between at least first and second states corresponding to first and second aperture sizes, respectively.

* * * * *